H. C. MINER.
Potato-Digger.
No. 203,481.  Patented May 7, 1878.
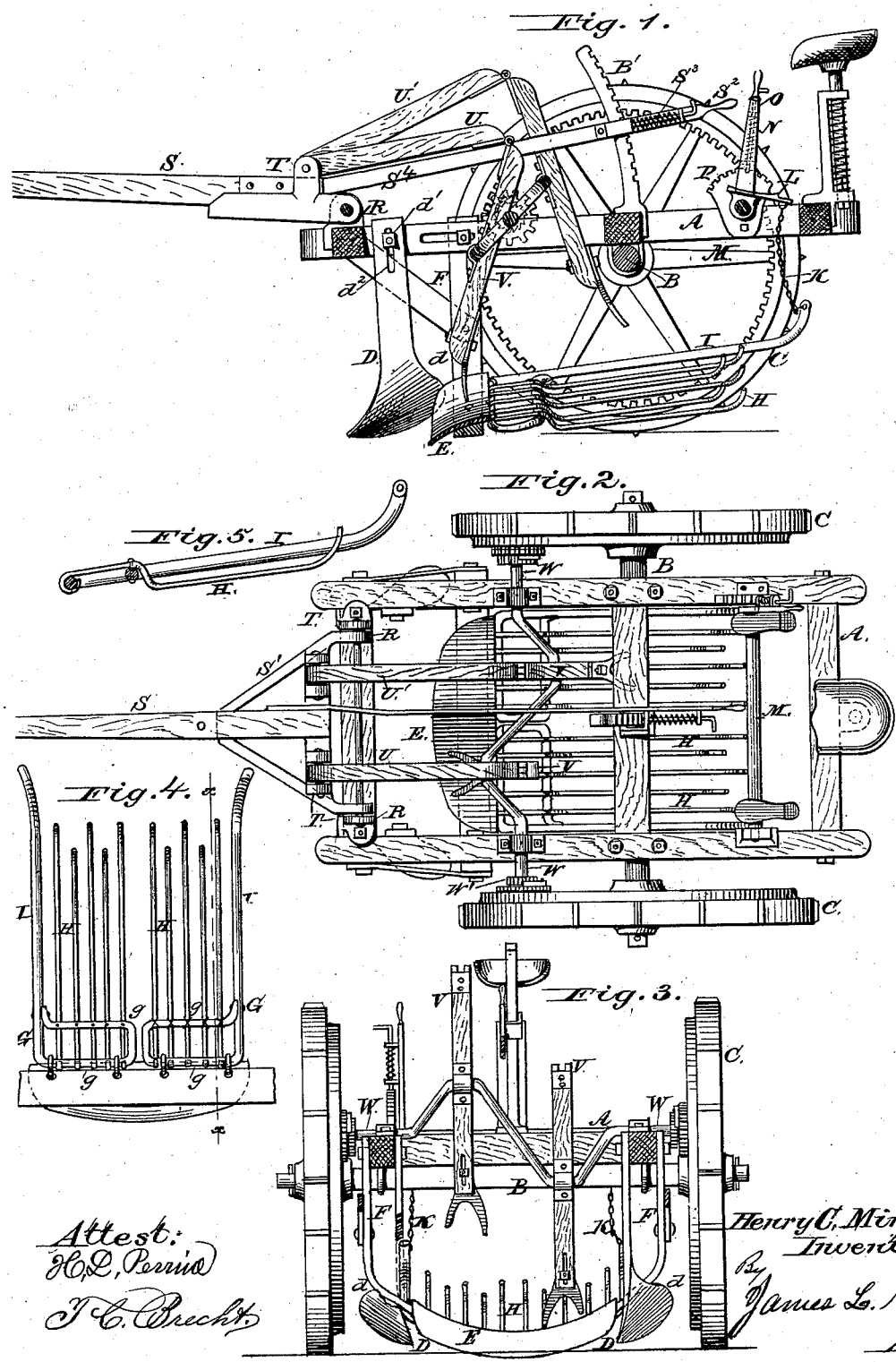

UNITED STATES PATENT OFFICE.

HENRY C. MINER, OF STAFFORD, NEW YORK.

IMPROVEMENT IN POTATO-DIGGERS.

Specification forming part of Letters Patent No. 203,481, dated May 7, 1878; application filed March 16, 1878.

*To all whom it may concern:*

Be it known that I, HENRY C. MINER, of Stafford, in the county of Genesee and State of New York, have invented certain new and useful Improvements in Potato-Diggers, of which the following is a specification:

This invention relates to certain improvements in potato-diggers; its object being to provide a machine by means of which the soil at each side of a hill of potatoes may be cut, loosened, and thrown out of the way, the hill thus cleared shoveled up, and the potatoes and soil thereof conveyed into the machine, and, finally, the potatoes and soil separated, and the soil and vegetation discharged at the rear of the machine, as more fully hereinafter set forth.

To this end my invention consists, first, in the combination, with the shovel of a potato-digger, of a separator, consisting of two sections, each composed of a series of parallel longitudinal bars, alternately of unequal length, and bent upwardly at their ends, secured to a transverse bent frame, provided with a backwardly-extending arm, parallel with the longitudinal bars, and hinged to the rear of the shovel, substantially as specified; second, in the combination with the truck and its draft-pole, which is pivoted thereto, of an adjustable separating device, for separating the potatoes from the soil, upon the separator, said device consisting of two levers, pivoted to the rear of the pivoted draft-pole, and connected at their rear ends to the upper ends of two traveling forked arms, connected to reversely-set cranks on a rotating shaft operated by the driving-wheels of the machine, in such manner as to convey vegetation collected by the shovel to the rear of the machine, as more fully hereinafter specified.

In the drawings, Figure 1 represents a side elevation of my invention. Fig. 2 represents a top view of the same. Fig. 3 represents a front view, with the draft-pole and its supports removed; Fig. 4, a detached bottom view of the shovel and the separator; and Fig. 5 is a section on line $x\ x$, Fig. 4.

The letter A represents the frame or truck of the machine, and B the axle, upon which are mounted the driving-wheels C. To the front of the truck or frame A, at each side, is secured, by means of a bolt, $d^1$, passing through a slot, $d^2$, a downwardly-projecting plow, D, the two being set at such distance apart as to conveniently straddle an ordinary potato-hill. Said plows are provided with reversely-set mold-boards $d$, which serve to throw the soil to each side of the hill after the shares of the plow have properly cut and separated the same, so as to leave the hill free to the action of the shovel, which directly follows said plows.

The letter E represents the shovel, extending transversely across the apparatus, immediately behind the plows, consisting of a curved metallic plate, secured at each end to the depending hangers F attached to each side of the frame or truck A. Said shovel is inclined forwardly, and has its front edge sharpened, in order more readily to enter and collect the hill and the potatoes therein, being so arranged as to travel immediately below the potatoes.

Immediately to the rear of the shovel E is pivoted a separator, consisting of two independent metallic frames, G G. Said frames are constructed, preferably, of metal bars, bent as shown at $g\ g$, Fig. 4, so as to form supports for the separator-bars H H, and having each a backwardly-extending arm, I, which is connected, by means of a link or chain, K, to a lever, L, on a rock-shaft, M, mounted at the rear of the machine, and provided with lever N, having a pawl, O, engaging a graduated sector, P, secured to the frame, by means of which the position of said separator may be adjusted with respect to the ground being traveled over.

The separator-bars H H are secured at their forward ends to the front bent portions of the frames G G, and extend backwardly to the rear bent portions of the same, to which they are secured by bolts or otherwise. From thence they descend obliquely downward a short distance, and then horizontally to the rear of the apparatus, terminating alternately at unequal distances and having their ends bent upwardly, as shown in the drawings. By this means a dish shape is given to each separator, and, owing to the alternate long and short bars of the separator and their curved ends, the potatoes are collected in the separator, while the soil and vegetation pass to the rear and are discharged.

To the front of the truck or frame are secured two upright standards, R R, between which the metallic supporting-section S' of the draft-pole S is pivoted. Said section is triangular in form, and at its base, at each side of the seat of the draft-pole, is provided with vertical lugs T T, in which are pivoted the ends of the links U U', extending backwardly and pivoted at their rear ends to the levers V V, through which pass the reversely-set cranks of a rotating shaft, W, located transversely across the frame A and journaled in bearings on opposite sides of the same. Each end of said shaft W is mounted with a cog or gear wheel, W', arranged to operate in connection with the driving-wheels, so as to rotate said shaft and impart to the levers V V a backward raking motion. The lower ends of said levers are forked, and operate in such position, relatively to the separator, as to convey the contents thereof to the rear and separate the potatoes from the soil and vegetation. The draft-pole S is provided with a rearwardly-extending arm, $S^4$, which is provided with a handle, $S^2$, under the control of the driver, and with a pawl, $S^3$, adapted to engage in the teeth of a graduated sector, B', secured to the frame A, to adjust the working position of the levers V V with respect to the separator as may be desired.

The operation of my invention is as follows: The machine, in starting, is to be so arranged that the plows will straddle the hill of potatoes. Upon advancing the machine the plows will cut and separate the soil at each side of the hill, throwing it out of the way, and leaving the hill clear, to be gathered up by the shovel immediately following. From thence the potatoes and soil gathered from the hill are carried to the separator, whereupon they are subjected to the action of the forked levers, by means of which they are thoroughly separated from the soil and vegetation.

What I claim is—

1. In combination with the shovel of a potato-digger, a separator consisting of two sections, each composed of a series of parallel longitudinal bars, alternately of different lengths, bent upward at their ends, secured to a transverse bent arm, provided with a backwardly-extending arm parallel with the longitudinal bars, and hinged to the rear of the shovel, substantially as and for the purposes specified.

2. In combination, with the truck, a draft-pole pivoted to the forward part thereof and provided with a backward extension, with a pawl attachment engaging a graduated sector, and the levers connected to the supporting-section of said draft-pole by means of suitable link, and secured to reversely-set cranks on a rotating shaft, operated by the driving-wheels of the machine, whereby the potatoes upon the separator are separated from the soil and vegetation, substantially as herein specified.

In testimony that I claim the foregoing I have hereunto set my hand in the presence of the subscribing witnesses.

HENRY C. MINER.

Witnesses:
JAMES L. NORRIS,
JAMES A. RUTHERFORD.